United States Patent [19]
Chennakeshu et al.

[11] Patent Number: 6,137,843
[45] Date of Patent: Oct. 24, 2000

[54] METHODS AND APPARATUS FOR CANCELING ADJACENT CHANNEL SIGNALS IN DIGITAL COMMUNICATIONS SYSTEMS

[75] Inventors: Sandeep Chennakeshu; Rajaram Ramésh; Gregory E. Bottomley, all of Cary; Paul W. Dent, Pittsboro, all of N.C.

[73] Assignee: Ericsson Inc., Research Triangle Park, N.C.

[21] Appl. No.: 08/901,693

[22] Filed: Jul. 28, 1997

Related U.S. Application Data

[63] Continuation-in-part of application No. 08/393,809, Feb. 24, 1995, Pat. No. 5,790,606.

[51] Int. Cl.$^7$ .................................................. H04L 25/08
[52] U.S. Cl. ........................................ 375/340; 375/349
[58] Field of Search ..................... 375/260, 262, 375/340, 341, 346, 349; 370/480; 455/303

[56] References Cited

U.S. PATENT DOCUMENTS

| | | |
|---|---|---|
| 5,202,903 | 4/1993 | Okanoue . |
| 5,390,215 | 2/1995 | Antia et al. . |
| 5,566,209 | 10/1996 | Forssén et al. . |
| 5,615,409 | 3/1997 | Forssén et al. . |
| 5,896,424 | 4/1999 | Uchida et al. ........................ 375/346 |
| 5,937,015 | 8/1999 | Dent et al. ............................ 375/341 |

FOREIGN PATENT DOCUMENTS

| | | |
|---|---|---|
| 0 637 139 A1 | 8/1994 | European Pat. Off. . |
| 0 725 488 A2 | 8/1996 | European Pat. Off. . |
| 0 762 702 A1 | 3/1997 | European Pat. Off. . |
| 459 137 | 10/1987 | Switzerland . |
| WO 94/00918 | 1/1994 | WIPO . |
| WO 96/04738 | 2/1996 | WIPO . |
| WO 96/26578 | 8/1996 | WIPO . |

OTHER PUBLICATIONS

Internatrional Search Report completed Oct. 7, 1998.
S.S.H. Wijayasuriya et al., "A Near–Far Resistant Sliding Window Decorrelating Algorithm for Multi–User Detectors in DS–CDMA Systems," *IEEE* 1992, pp. 1331–1338.

(List continued on next page.)

*Primary Examiner*—Amanda T. Le
*Attorney, Agent, or Firm*—Burns, Doane, Swecker & Mathis, L.L.P.

[57] ABSTRACT

A multi-signal cancelling demodulator in which signals of interest are demodulated using information obtained during demodulation of adjacent signals. By utilizing detected information in an across-channel fashion, exemplary cancelling demodulators provide superior adjacent channel interference rejection. The cancelling demodulation is conducted in either serial or parallel fashion. In exemplary parallel demodulation embodiments, two channels are demodulated simultaneously in iterative fashion. Detected information obtained at each step in the iterative process is used as a priori information for demodulation in a following step. In exemplary serial demodulation embodiments, the stronger of two received signals is demodulated, and the resulting detected information is used as a priori information for demodulation of the weaker of the two received signals. For both the serial and parallel demodulation embodiments, novel techniques are disclosed for transforming symbols detected in one frequency band to corresponding symbols in adjacent frequency bands. Such inter-channel transformations are also applied in the context of channel estimation. In an exemplary channel estimator, multiple channel parameter estimates for a particular frequency channel are provided based on a received baseband signal corresponding to that frequency channel. Since inter-channel information is used in providing the channel parameter estimates, the exemplary channel estimator provides superior adjacent channel interference rejection.

16 Claims, 5 Drawing Sheets

OTHER PUBLICATIONS

S.S.H. Wijayasuriya et al., "Rake Decorrelating Receiver for DS–CDMA Mobile Radio Networks," pertinent pages.

S.S.H. Wijayasuriya et al., Rake Decorrelation as an Alternative to Rapid Power Control in DS–CDMA Mobile Radio, *IEEE*, 1993, pp. 368–370.

A. Xie et al., "A Family of Suboptimum Detectors for Coherent Multiuser Communications," *IEEE Journal on Selected Areas in Communications*, vol. 8, No. 4, May 1990, pp. 683–690.

J. Thielecke et al., "Interference Reduction Applied to Channel Estimation in CDMA Systems, " *IEEE*, 1994, pp. 752–756.

R.S. Mowbray et al., "New Antimultipath Technique for Spread Spectrum Receivers," *Electronic Letters*, vol. 28, No. 5, Mar. 4, 1993, pp. 456–458.

G. Ungerboeck, "Adaptive Maximum–Likelihood Receiver for Carrier–Modulated Data–Transmission Systems," *IEEE Transactions on Communications*, vol. COM–22, No. 5, May 1974, pp. 624–636.

Z. Zvonar et al., "Coherent and Differentially Coherent Multiuser Detectors for Asynchronous CDMA Frequency–Selective Channels," *IEEE*, 1992, pp. 442–446.

S. Verdu, "Minimum Probability of Error for Asynchronous Gaussian Multiple–Access Channels," *IEEE Transactions on Information Theory* vol. IT–32, No. 1, Jan. 1986, pp. 85–96.

R. Lupas, "Linear Multiuser Detectors for Synchronous Code–Division Multiple–Access Channels," *IEE Transactions on Information Theory*, vol. 1, No. 1, Jan. 1986, pp. 123–136.

R. Lupas et al., "Near–Far Resistance of Multiuser Detectors in Asychronous Channels," *IEEE Transactions on Communications*, vol. 38, No.4, Apr. 1990, pp. 496–508.

Z. Zvonar et al., "Suboptimum Multiuser Detector for Synchronous CDMA Frequency–Selective Rayleigh Fading Channels," *CTMC*, 1992, pertinent pages.

Z. Zvonar et al., "Optimum Detection in Asynchronous Multiple–Access Multipath Rayleigh Fading Channels," *26th Annual Conference on Info–Sciences Systems*, 1992, pertinent pages.

Z. Xie et al., "Joint Signal Detection and Parameter Estimation in Multiuser Communications," *IEEE Transactions on Communications*, vol. 41, No. 7, Aug. 1993, pp. 1208–1216.

Y.C. Moon et al., "A Spread–Spectrum Multiaccess System with Cochannel Interference Cancellation for Multipath Fading Channels," *IEEE Journal on Selected Areas in Communications*, vol. 11, No. 7, Sep. 1993, pp. 1067–1075.

Y.C. Moon et al., "A Spread–Spectrum Multiaccess System with Cochannel Interference Cancellation for Multipath Fading Channels," *IEEE Journal on Selected Areas in Communications*, vol. 11, No. 7, Sep. 1993, pp. 1067–1075.

A. Kajiwara, "On Synchronous CDMA For Mobile Communications," *IEEE*, 1992, pp. 858–862.

Z. Zvonar et al., "Adaptive Multiuser Receiver for Fading CDMA Channels with Severe ISI," *Proceedings of Conference on Information Sciences and Systems*, Mar. 1993, pertinent pages.

Z. Zvonar et al., "A Comparison of Differentially Coherent and Coherent Multiuser Detection with Imperfect Phase Estimates in a Rayleigh Fading Channel," p. 48.

Z. Zvonar et al., "On Multiuser Detection in Asynchronous CDMA Flat Rayleigh Fading Channels," *PIMRC*, 1992, pertinent pages.

Z. Zvonar et al., "Optimum Multiuser Detection in Single–Path Rayleigh Fading Channels," $29^{th}$ *Allerton Conference on Communication, Control and Computing*, Oct. 1991, pertinent pages.

S. Sampei et al., "Rejection Method of Adjacent Channel Interference for Digital Land Mobile Communications," *The Transactions of the IECE of Japan*, vol. E69, No. 5, May 1986, pp. 578–580.

P. Dent, et al., CDMA–IC: A Novel Code Division Multiple Access Scheme Based on Interference Cancellation, *PIMRC*, Boston, pertinent pages, 1992.

P. Patel et al., "Anaylsis of a Simple Successive Interference Cancellation Scheme in a DS/CDMA System," *IEEE Journal on Selected Areas in Communications*, vol. 12, No. 5, pp. 796–807, Jun. 1994.

R. Kohno et al., "An Adaptive Canceller of Cochannel Interference for Spread–Spectrum Multiple–Access Communication Networks in a Power Line," *IEEE Journal on Selected Areas in Communications*, vol. 8, No. 4, pp. 691–699, May 1990.

R. Kohno et al., "Combination of an Adative Array Antenna and a Canceller of Interference for Direct–Sequence Spread– Spectrum Multiple–Access System," *IEEE Journal on Selected Areas in Communications*, vol. 8, No. 4, pp. 675–682, May 1990.

A.J. Viterbi, "Very Low Rate Convolutional Codes for Maximum Theoretical Performance of Spread–Sprectrum Multiple Access Channels", *IEEE Journal on Selected Areas in Communications*, vol. 8, No. 4, pp. 641–649, May 1990.

K. Giridhar et al., "Joint Estimation Algorithms for CoChannel Signal Demodulation", Proceedings of the International Conference on Communications (ICC), Geneva, May 23–26, 1993, vol. 3 of 3, IEEE, pp. 1497–1501.

B. R. Petersen et al., "Suppression of Adjacent–Channel, CoChannel, and Intersymbol Interference by Equalizers and Linear Combiners", IEEE Transactions on Communications, vol. 42, No. 12, Dec. 1994, pp. 3109–3118.

800

METHODS AND APPARATUS FOR CANCELING ADJACENT CHANNEL SIGNALS IN DIGITAL COMMUNICATIONS SYSTEMS

CROSS-REFERENCE TO RELATED APPLICATIONS

This application is a continuation in part of U.S. patent application Ser. No. 08/393,809, now U.S. Pat. No. 5,790,606, filed Feb. 24, 1995 and entitled "Joint Demodulation using Spatial Maximum Likelihood", which is incorporated herein by reference.

BACKGROUND

The present invention relates to digital communications systems and, more particularly, to demodulation of adjacent channel signals.

Today, digital communication systems are developing rapidly for both wireline and wireless applications. Wireless applications include private land mobile radio (e.g., police, dispatch), cellular, PCS, satellite, wireless local loop, and others. Wireline applications include ADSL, high speed modems, and data storage. In such systems, information is converted to information symbols, typically binary in value, which are encoded and modulated to create a form that can be transferred via a transmission medium such as wires, the air (e.g., using radio waves), or magnetic tape. Typically, the symbol values are passed through pulse shaping filters prior to transmission so that the transmitted signal will have a compact power spectrum.

In wireless communications, radio spectrum is shared between multiple communication channels. A combination of frequency division multiple access (FDMA), time division multiple access (TDMA) and code division multiple access (CDMA) is typically used. Space division multiple access (SDMA), which allows for reuse of channels in spatially separated areas, is also known. The multiple access problem is often encountered in wireline and data storage applications as well. Thus, while the discussion below focuses on wireless communications, those skilled in the art will appreciate that analogous problems and solutions are also applicable in wireline and data storage systems.

Most wireless systems include an FDMA component, in which an available frequency spectrum is divided into multiple frequency bands, each corresponding to a different carrier frequency. When closely spaced, or adjacent carriers are used to transmit information simultaneously, interference between the respective carrier frequencies or radio channels arises, and communications quality can be diminished. Thus, an ability to operate in the presence of adjacent channel interference (ACI) is essential if high communications quality and customer satisfaction are to be achieved.

Further complicating the adjacent channel interference problem is the fact that, as demand for communications grows, ever greater spectral efficiency is required. In an FDMA system, such spectral efficiency is achieved through tighter carrier spacing which allows for more carriers to be used within a given spectrum allocation. This in turn requires further receiver resilience to adjacent channel interference.

In conventional radio receivers, bandpass filtering is used to separate FDMA channels, and each FDMA channel is processed and demodulated separately thereafter. However, because the filtering function is not perfect, adjacent channel interference is inevitably contained within the filtered signal.

Traditionally, adjacent channel interference was ignored or treated as noise in the channel demodulation process. More recently, radio frequency (RF) processing techniques for compensating for adjacent channel interference have been proposed.

One such technique is described in S. Sampei and M. Yokoyama, "Rejection Method of Adjacent Channel Interference for Digital Land Mobile Communications," Trans. IECE, Vol. E 69, No. 5, pp. 578–580, May 1986, which is incorporated herein by reference. The cited method teaches that, during demodulation of a given carrier signal, a bandpass filter centered at an adjacent carrier is used to extract an adjacent channel signal (ACS) at the adjacent carrier. The extracted signal is then used to estimate the adjacent channel signal envelope and carrier and to coherently detect the adjacent channel signal. The detected adjacent channel signal is then waveform shaped, and the estimated adjacent channel carrier and envelope are impressed on the resulting signal. Ideally, the described process provides a reconstructed adjacent channel signal at its carrier frequency. The reconstructed signal can then be passed through a bandpass filter centered at the carrier of interest and subtracted from the received signal to remove the adjacent channel interference.

Such an approach has several limitations, however. For example, analog signal processing using filters and mixers adds undesirable cost and size to a radio receiver, and since the analog components vary with the manufacturing process, such receivers provide a relatively unpredictable range of performance. Additionally, subtracting a signal at radio frequency requires highly accurate carrier reconstruction and time alignment, as an error as small as half a cycle at radio frequency can cause the adjacent channel signal to double rather than diminish. Furthermore, such use of the adjacent channel carrier (phase and frequency) and envelope (amplitude) implicitly assumes that the radio channels are not dispersive. However, in many practical wireless systems (e.g., D-AMPS and GSM), the symbol rate is sufficiently high that the radio transmission medium must be modeled to include time dispersion which gives rise to signal echoes. Thus, the proposed technique is not always practical for use in many present day applications.

Accordingly, there is a need for improved methods and apparatus for enhancing receiver performance in the presence of adjacent channel interference.

SUMMARY OF THE INVENTION

The present invention fulfills the above-described and other needs by providing a multi-signal cancelling demodulator in which signals are demodulated using information obtained during demodulation of other, adjacent signals. By utilizing detected information in an across-channel fashion, the cancelling demodulator of the present invention provides superior adjacent channel interference rejection. The cancelling demodulation can be conducted in either serial or parallel fashion. In an exemplary embodiment utilizing parallel demodulation, two channels are demodulated simultaneously in iterative fashion. Detected information obtained at each step in the iterative process is used as a priori information for demodulation in the following step. In an exemplary embodiment utilizing serial demodulation, the stronger of two received signals is demodulated, and the resulting detected information is used as a priori information for demodulation of the weaker of the two received signals.

In both the serial and parallel demodulation embodiments, the present invention teaches novel techniques for transforming symbols detected in one frequency band to corresponding symbols in adjacent frequency bands. The transformations are based in part on the carrier spacing existing between adjacent channels. Advantageously, the inter-channel transformations can also be applied in the context of channel estimation. Thus, the present invention further teaches a channel estimator in which multiple channel parameter estimates for a particular frequency channel are provided based on a received baseband signal corresponding to the particular frequency channel. Since inter-channel information is used in providing the channel parameter estimates, the channel estimator of the present invention also provides superior adjacent channel interference rejection.

The above described and other features of the present invention are explained hereinafter with reference to the illustrative examples shown in the accompanying drawings. Those skilled in the art will appreciate that the exemplary embodiments are provided by way of explanation and that numerous variations and equivalents are contemplated herein.

DETAILED DESCRIPTION

Figure 1:
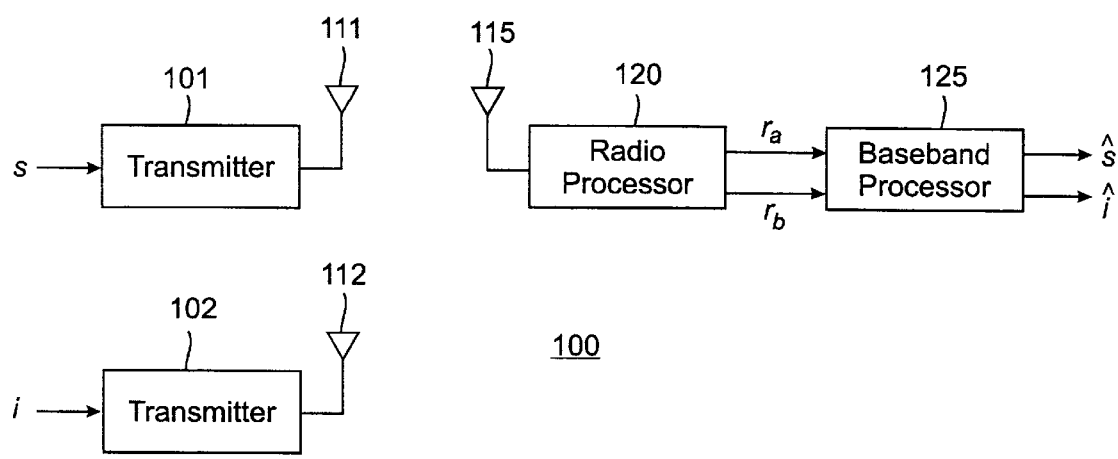
FIG. 1 depicts a digital wireless communications system in which the teachings of the present invention can be implemented.

FIG. 1 depicts a radiocommunications system 100 in which the teachings of the present invention can be utilized. As shown, the communications system 100 includes first and second transmitters 101, 102, first and second transmit antennas 111, 112, a receive antenna 115, a radio processor 120 and a baseband processor 125. A first input symbol stream S is coupled to an input of the first transmitter 101, and an output of the first transmitter 101 is coupled to the first transmit antenna 111. A second input symbol stream i is coupled to an input of the second transmitter 102, and an output of the second transmitter 102 is coupled to the second transmit antenna 112. The receive antenna 115 is coupled to an input of the radio processor 120, and first and second received baseband signals $r_a$, $r_b$ output by the radio processor 120 are coupled to first and second inputs of the baseband processor 125. The baseband processor 125 provides first and second estimated symbol streams ŝ, î.

In operation, the first and second transmitters 101, 102 map the digital input symbol streams s, i, respectively, to signal representations which are appropriate for the transmission medium existing between the transmitters 101,102 and the receiver 120. In wireless systems, this mapping typically includes modulation and pulse shaping prior to transmission via the antennas 111, 112. To transmit the resulting signals, the first transmitter 101 uses a first carrier frequency $f_a$ (corresponding to a first transmission frequency band a), while the second transmitter 102 uses a second carrier frequency $f_b$ (corresponding to a second transmission frequency band b).

The transmitted signals pass through the transmission medium and are received at the receive antenna 115. The radio processor 120 converts the received antenna signal to first and second baseband sample sequences $r_a$, $r_b$, corresponding to the first and second carrier frequencies $f_a$, $f_b$, respectively. The conversion to baseband is typically accomplished by filtering, amplifying, mixing, sampling and quantizing the received signals. For spread-spectrum systems, despreading is also included, either before or after the sampling and quantization operations. The baseband samples are typically complex, including both an in-phase (I) and quadrature (Q) component, though the invention is applicable to systems utilizing other types of samples as well. Generally, the radio processor 120 provides sufficient, or more than sufficient, statistics for detecting the transmitted symbols. Given the received baseband signals $r_a$, $r_b$, the baseband processor 125 provides estimates of the transmitted symbol values. Soft, or reliability information may also be provided as is known in the art.

Figure 2:
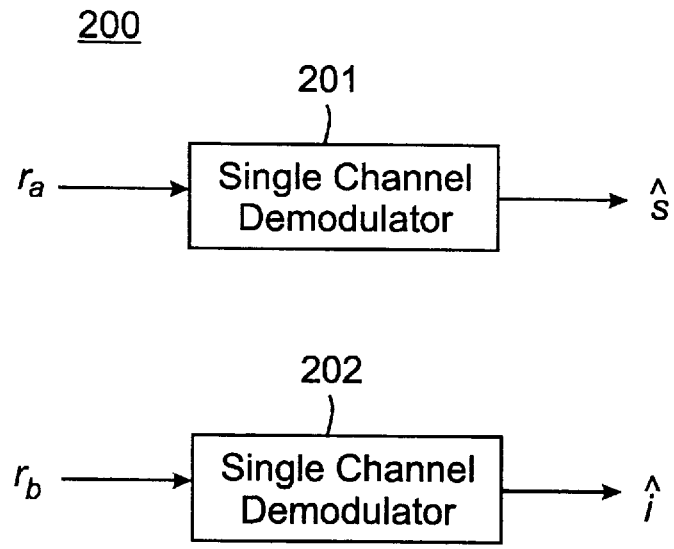
FIG. 2 depicts a conventional baseband processor.

FIG. 2 depicts a conventional two-channel baseband processor 200 which can be used in the system 100 of FIG. 1. As shown, the conventional baseband processor 200 includes first and second single-channel demodulators 201, 202. The first received baseband signal $r_a$ is coupled to an input of the first single-channel demodulator 201, and the second received baseband signal $r_b$ is coupled to an input of the second single-channel demodulator 202. The first and second single-channel demodulators 201, 202 provide estimates ŝ, î of the first and second input symbol streams s, i (transmitted in the first and second frequency bands a, b), respectively. The first and second single-channel demodulators 201, 202 provide the estimates ŝ, î using well known signal detection techniques. As described above, however, there is no inter-channel interaction between the two demodulation chains. As a result, the conventional processor 200 is not robust against adjacent channel interference.

Figure 3:
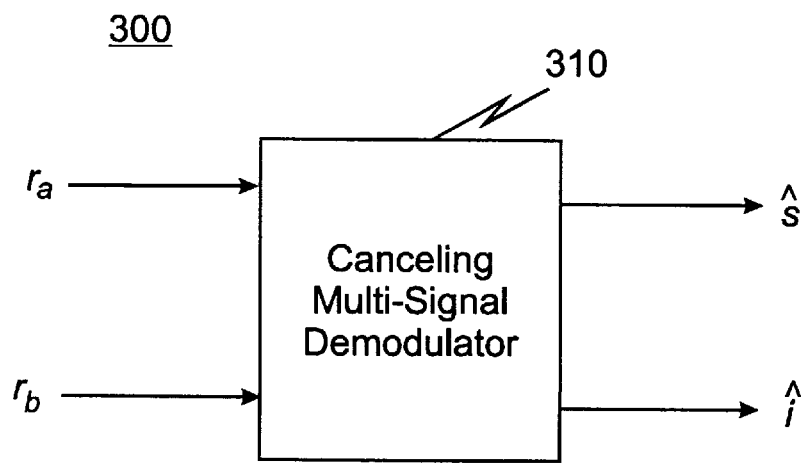
FIG. 3 depicts a baseband processor according to the present invention.

FIG. 3 depicts a two-channel baseband processor 300 according to the present invention. As shown, the two-channel processor 300 includes a canceling multi-signal demodulator 310. The first and second received baseband signals $r_a$, $r_b$ are coupled to first and second inputs of the cancelling multi-signal demodulator 310, and the cancelling multi-signal demodulator 310 provides estimates ŝ, î of the first and second input symbol streams s, i (transmitted in the first and second frequency bands a, b), respectively. As described in more detail below with respect to FIGS. 4 and 5, the canceling demodulator 310 utilizes information obtained in detecting one symbol stream to aid in demodulation of the other symbol stream and vice versa. As a result, the baseband processor 300 of the present invention is more robust against adjacent channel interference.

Figure 4:
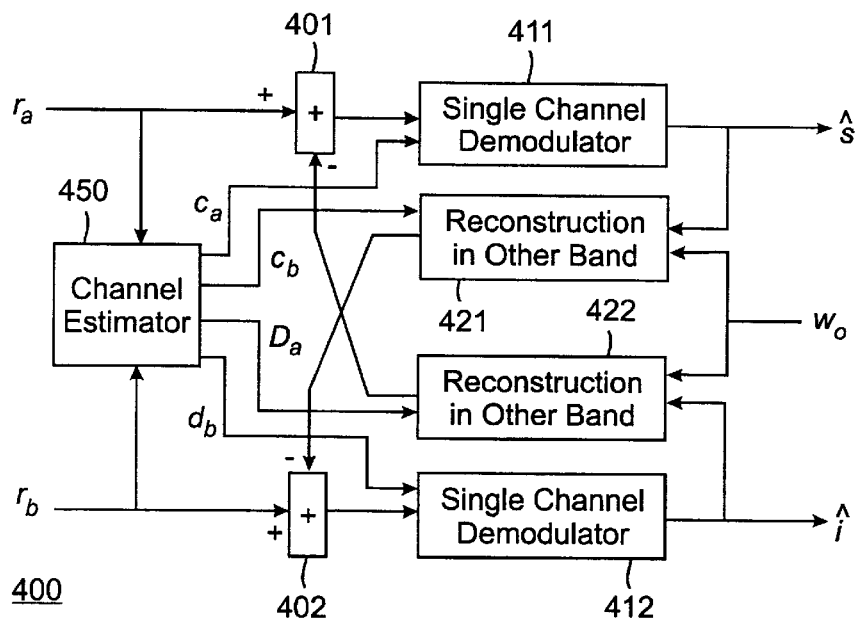
FIG. 4 depicts an exemplary embodiment of the baseband processor of FIG. 3.

FIG. 4 depicts a first embodiment of a two-channel baseband processor 400 according to the present invention. As shown, the processor 400 includes first and second summing devices 401, 402, first and second single-channel demodulators 411, 412, first and second reconstruction-in-other-band devices 421, 422, and a channel estimator 450. The first baseband signal $r_a$ is coupled to an additive input of the first summing device 401 and to a first input of the channel estimator 450. The second baseband signal $r_b$ is coupled to an additive input of the second summing device 402 and to a second input of the channel estimator 450. The channel estimator 450 provides four channel response estimates $c_a$, $C_b$, $D_a$, $d_b$, which are coupled to first inputs of the first single-channel demodulator 411, the first reconstruction-in-other-band device 421, the second reconstruction-in-other-band device 422, and the second single-channel demodulator 412, respectively. Outputs of the first and second summing devices 401, 402 are coupled to second inputs of the first and second single-channel demodulators 411, 412, respectively.

The first single-channel demodulator 411 provides a first output estimate ŝ of the first input symbol stream s, and the second single-channel demodulator 412 provides a second output estimate î of the second input symbol stream i. In addition to serving as first and second outputs of the baseband processor 400, the first and second estimates ŝ, î are also coupled to second inputs of the first and second reconstruction-in-other-band devices 421, 422, respectively. A carrier spacing $\omega_0$, corresponding to the separation in radians per symbol period between the first and second carrier frequencies $f_1$, $f_2$, is coupled to a third input of each of the first and second reconstruction-in-other-band devices 421, 422. Outputs of the first and second reconstruction-in-other-band devices 421, 422 are coupled to subtractive inputs of the second and first summing devices 402, 401, respectively.

In operation, the first and second summing devices 401, 402 are initially inhibited so that the first and second received baseband signals $r_a$, $r_b$ pass straight through to the first and second single-channel demodulators, respectively. The first and second single-channel demodulators 411, 412 detect the first and second digital symbol streams s, i using known techniques. The first reconstruction-in-other-band device 421 then uses the first detected symbol stream ŝ to provide an estimate of the first signal s as it would appear in the second baseband (i.e., an estimate of adjacent channel interference in the second baseband due to the first signal s). Similarly, the second reconstruction-in-other-band device 422 uses the second detected symbol stream î to provide an estimate of the second signal i as it would appear in the first baseband (i.e., an estimate of adjacent channel interference in the first baseband due to the second signal i). Operation of the first and second reconstruction-in-other-band devices 421, 422 and the channel estimator 450 is described in more detail below.

Once the estimates ŝ, î have been reconstructed in the respective adjacent bands, the first and second summing devices 401, 402 are enabled. The first summing device 401 subtracts the second reconstructed signal (corresponding to the second signal i as it would appear in the first band a) from the first received baseband samples $r_a$, and the second summing device 402 subtracts the first reconstructed signal (corresponding to the first signal s as it would appear in the second band b) from the second received baseband samples $r_b$. The first and second single-channel demodulators 411, 412 then use the outputs of the first and second summing devices 401, 402 to again estimate the first and second digital symbol streams s, i. Since an estimate of the adjacent channel interference in each band has been removed, the succeeding symbol estimates will be superior to the previous symbol estimates.

The above described process can be repeated as appropriate. For example, the process can be repeated until a number of detected symbol values that change from iteration to iteration becomes constant or reaches some acceptable maximum allowable level. Knowledge of which symbols alternate in each iteration can be used afterward to erase those symbols or to adjust corresponding soft values, thereby improving any subsequent diversity combining or error correction decoding.

The first and second single-channel demodulators 411, 412 can employ coherent or noncoherent detection methods. Additionally, the demodulators 411, 412 can include various forms of equalization, including linear, decision feedback, MLSE, or MAP symbol-by-symbol equalization. For direct-sequence spread spectrum systems, the demodulators 411, 412 can include Rake combining.

The reconstruction-in-other-band units 421, 422 use channel coefficient estimates, carrier offset information, and detected symbol values to estimate a detected or known signal as it would appear in a frequency band corresponding to another, adjacent signal. To understand the reconstruction process, assume that the first received baseband sample stream $r_a$ is given by the following symbol-spaced model:

$$r_a(n) = c_a(0)s(n) + c_a(1)s(n-1) + e^{j\omega_0 n}[d_a(0)i(n) + d_a(1)i(n-1)] \quad (1)$$

where $\omega_0$ is the carrier spacing between the first and second carrier frequencies $f_a$, $f_b$ in radians per symbol period, $c_a(k)$ is the kth channel coefficient corresponding to the first signal s in the first frequency band, $d_a(k)$ is the kth channel coefficient corresponding to the second signal i in the first frequency band, and s(n) and i(n) are the first and second transmitted symbol streams s, i as a function of time index n. Note that the first coefficient sequence $\{c_a(k); k=0, \ldots, K_1-1\}$ ($K_1 \geq 1$) forms the channel response for the first signal s in the first band a, and the second coefficient sequence $\{d_a(k); k=0, \ldots, K_2-1\}$ ($K_2 \geq 1$) forms the channel response for the second signal i in the first band a. In general, the number of channel coefficients $K_1$, $K_2$ for each signal s, i can be different. For clarity, however, each channel response in equation (1) is modeled using just two coefficients without loss of generality. Those skilled in the art will appreciate that equation (1) represents a simplified model which can be expanded to account for additional adjacent channel interferers, thermal noise, etc. Those skilled in the art will also appreciate that a model analogous to that of equation (1) can be provided for the second received baseband signal $r_b$.

By distributing the exponential term in equation (1), the model can be expressed equivalently as follows:

$$r_a(n) = c_a(0)s(n) + c_a(1)s(n-1) + d'_a(0,n)i(n) + d'_a(1,n)i(n-1) \quad (2)$$

where $$d'_a(0,n) = e^{j\omega_0 n} d_a(0) \quad (3)$$

$$d'_a(1,n) = e^{j\omega_0 n} j_a(1) \quad (4)$$

In the model as defined in equations (2) through (4), the effective channel coefficients for the interfering signal (i.e., the d'$_a$ terms) spin, or rotate, with time n. Such rotation is highly undesirable for purposes of performing channel estimation, which assumes that channel coefficients vary slowly, if at all, with time. The present invention teaches, however, that this apparent problem can be eliminated by coupling the exponential term in equation (2) with the interfering symbols rather than the channel estimates. Doing so provides the following alternative model for the first received baseband sample stream $r_a$:

$$r_a(n) = c_a(0)s(n) + c_a(1)s(n-1) + D_a(0)i'(n) + D_a(1)i'(n-1) \quad (5)$$

where $$i'(n) = e^{j\omega_0 n} n(n) \quad (6)$$

$$D_a(0) = d_a(0) \quad (7)$$

$$D_a(1) = e^{j\omega_0} d_a(1) \quad (8)$$

The despun, or unrotated coefficients $D_a$ may then be estimated, for example, by correlating the received signal samples with a spun-up or twisted (i.e., rotated) symbol sequence i'(n). Such a technique has been applied in a different context for estimating channel coefficients and a frequency error in a communications system subject to frequency inaccuracies. See, for example, Swedish Patent Application No. 8703796, issued Apr. 2, 1989 to Raith, which is incorporated herein by reference. In the present context, there typically is no unknown frequency inaccuracy, and the amount of twist or rotation applied to the correlation pattern is related to the known channel spacing $\omega_0$.

An analogous model for the second received baseband sample stream $r_b$ can be provided as follows:

$$r_b(n)=C_b(0)s'(n)+C_b(1)s(n-1)+d_b(0)i(n)+d_b(1)i(n-1) \quad (9)$$

where $$s'(n)=e^{-j\omega_0 n}S(n) \quad (10)$$

Thus, given channel coefficient estimates $c_a(k)$, $D_a(k)$, carrier spacing $\omega_0$, and in-band estimates $\hat{s}$, $\hat{i}$ of the transmitted symbol streams s, i, the reconstruction-in-other-band units 411, 412 can provide adjacent-band estimates of the symbol streams s, i using equation (5). The in-band estimates $\hat{s}$, $\hat{i}$ are provided by the single-channel demodulators 411, 412 as described above, and the carrier spacing $\omega_0$ will be known for each given system. Alternatively, the carrier spacing $\omega_0$ can be estimated to compensate for transmitter and/or receiver frequency error. Additionally, the channel parameter estimates $c_a(k)$, $D_a(k)$ can be obtained using either the previously mentioned correlation approach or the novel techniques described below with respect to FIGS. 6, 7 and 8.

Figure 5:
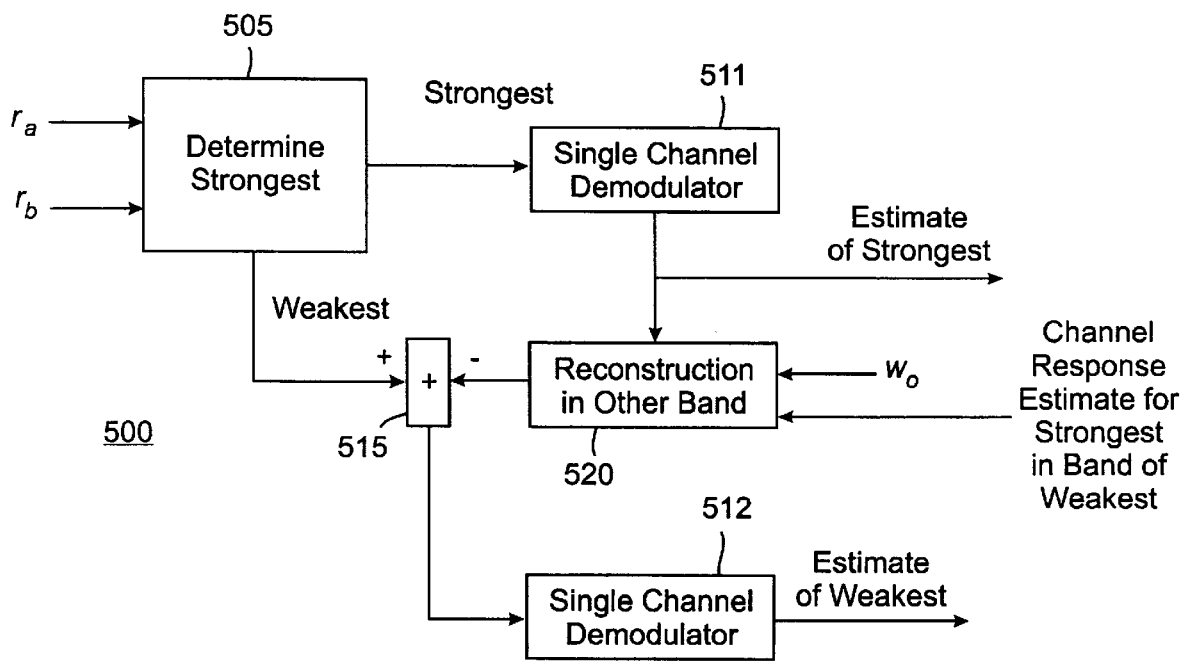
FIG. 5 depicts an alternative embodiment of the baseband processor of FIG. 3.

FIG. 5 depicts an alternative embodiment of a two-channel baseband processor 500 according to the present invention. As shown, the processor 500 includes a determine-strongest device 505, first and second single-channel demodulators 511, 512, a summing device 515 and a reconstruction-in-other-band device 520. The first and second received baseband signals $r_a$, $r_b$ are coupled to first and second inputs of the determine-strongest device 505. A first output of the determine-strongest device 505 is coupled to an input of the first single-channel demodulator 511, and a second output of the determine-strongest device 505 is coupled to an additive input of the summing device 515. The first single-channel demodulator 511 provides a first estimate output which is coupled to an input of the reconstruction-in-other-band device 520. A carrier spacing $\omega_0$ is coupled to a second input of the reconstruction-in-other-band device 520, and a channel response estimate is coupled to a third input of the reconstructioni-in-other-band device 520. An output of the reconstruction-in-other-band device 520 is coupled to a subtractive input of the summing device 515. An output of the summing device 515 is coupled to an input of the second single-channel demodulator 512, and the second single-channel demodulator 512 provides a second estimate output.

In operation, the determine-strongest device determines which of the transmitted signals is largest in some sense. For example, the strongest signal can be obtained by measuring the relative power in each received baseband sample stream. Alternatively, the strongest signal can be determined by comparing a sum of squared magnitudes of channel estimates for the first signal in the first band with a sum of squared magnitudes of channel estimates of the second signal in the second band. Baseband samples corresponding to the band of the strongest received signal are provided as input to the first single-channel demodulator 511, which then detects symbol values corresponding to the strongest received signal.

The detected values are in turn provided as input to the reconstruction-in-other-band device 520, which uses the carrier offset $\omega_0$ to reconstruct the strongest signal in the band corresponding to the weakest signal. The reconstructed signal is then subtracted from the baseband samples corresponding to the weakest signal in the summing device 515. The resulting signal is provided as input to the single-channel demodulator 512, which detects symbols corresponding to the weakest signal. Since the strongest received signal is inherently resilient to adjacent channel interference, and since an estimate of adjacent channel interference is removed from the weakest received signal, the detected symbols provided by the embodiment of FIG. 5 are more accurate as compared to those provided by prior art systems. The single channel demodulators 511, 512 and the reconstruction-in-other-band device 520 operate as described above with respect to FIG. 4.

As noted above, the reconstruction-in-other-band devices 421, 422, 520 of the embodiments of FIGS. 4 and 5 utilize complex channel coefficient estimates. Additionally, the determine-strongest device 505 can utilize channel coefficient estimates, and the single-channel demodulators 411, 412, 511, 512 will utilize channel coefficient estimates when coherent detection is employed. The coefficient estimates can be scaled to account for noise in the estimation process. Advantageously, the present invention teaches that accurate channel estimates can be obtained using carrier offset information in combination with the model provided above.

Specifically, using equations (5)–(10), stationary or slowly varying channel estimates can be obtained. For example, least squares channel estimates can be obtained using equations (5) and (9) and knowledge of the first and second transmitted information streams s(n), i(n). The carrier offset $\omega$ which is known or estimated, is used to rotate the known or detected interferer symbol values prior to channel estimation. Generally, channel estimation is performed using a channel estimation device such as that shown in FIG. 6.

Figure 6:
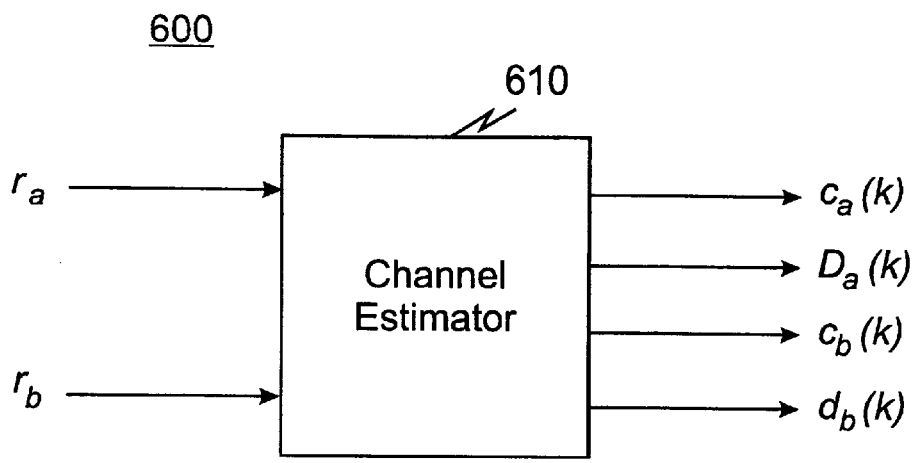
FIG. 6 depicts a channel estimator according to the present invention.

In FIG. 6, a channel estimation device 600 includes a two-band channel estimator 610. The first and second received baseband signals $r_a$, $r_b$ are coupled to first and second inputs of the channel estimator 610, respectively, and the channel estimator 610 provides four channel impulse-response parameter estimates $c_a(k)$, $D_a(k)$, $C_b(k)$, $d_b(k)$ as output. The four channel response estimates $c_a$, $D_a$, $C_b$, $d_b$ correspond to channel coefficients for the first signal s in the first band a, the second signal i in the first band a, the first signal s in the second band b, and the second signal i in the second band b, respectively. Known or detected symbol values can be used to aid channel estimation as is known in the art. For example, synchronization bits which are known at a receiver a priori can be inserted periodically into the transmitted information sequences s, i.

Figure 7:
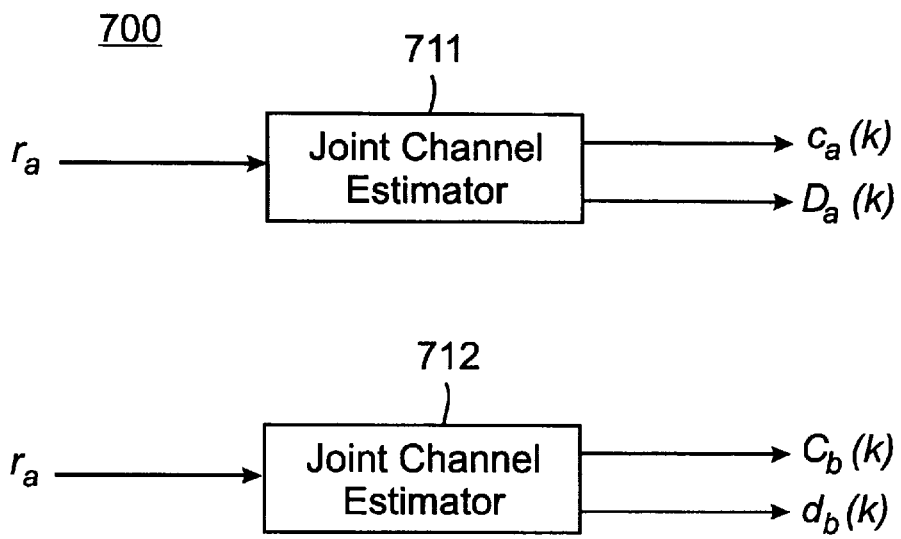
FIG. 7 depicts an exemplary embodiment of the channel estimator of FIG. 6.

FIG. 7 depicts a first embodiment of a two-band channel estimation device 700 according to the present invention. As shown, the channel estimation device 700 includes first and second joint channel estimators 711, 712. The first received baseband signal $r_a$ is coupled to an input of the first joint channel estimator 711, and the first joint channel estimator 711 provides first and second channel estimates $c_a$, $D_a$ for the first and second signals s, i in the first band a. Similarly, the second received baseband signal $r_b$ is coupled to an input of the second joint channel estimator 712, and the second joint channel estimator 712 provides first and second channel estimates $C_b$, $d_b$ for the first and second signals s, i in the second band b.

In operation, the first joint channel estimation device 711 jointly estimates the channel coefficients $c_a$, $D_a$ for the first band a. For example, least squares estimates of $c_a$ and $D_a$ can be obtained using equation (5) for a set of received values n=1, ..., N. For example, for the case where each impulse response includes two channel taps, the goal is to find channel coefficients $c_a(0)$, $c_a(1)$, $D_a(0)$, $D_a(1)$ that minimize the following summation:

$$\sum_n |e_a(n)|^2 \qquad (11)$$

where $$e_a(n)=r_a(n)-c_a(0)s(n)-c_a(1)s(n-1)-D_a(0)i'(n)-D_a(1)i'(n-1) \qquad (12)$$

Methods for solving the problem presented by equations (11) and (12) are well known, and solutions generally have the following form:

$$x=(S^H S)^{-1} S^H r \qquad (13)$$

where x is a vector containing the channel coefficient estimates, S is a matrix containing symbol values s(n) and i'(n), and r is a vector containing received samples for the first baseband sample stream $r_a(n)$.

The second channel estimation device 712 jointly estimates the channel coefficients $C_b$, $d_b$ for the second band b in a similar fashion. By way of contrast, if the coefficients $c_a$ and $D_a$ are estimated separately, then the second signal i would create added noise when estimating $c_a$, and the first signal s would create added noise when estimating $D_a$. Thus, by estimating both coefficients $c_a$, $D_a$ jointly, the present invention reduces estimation noise as compared to the correlation method.

Figure 8:
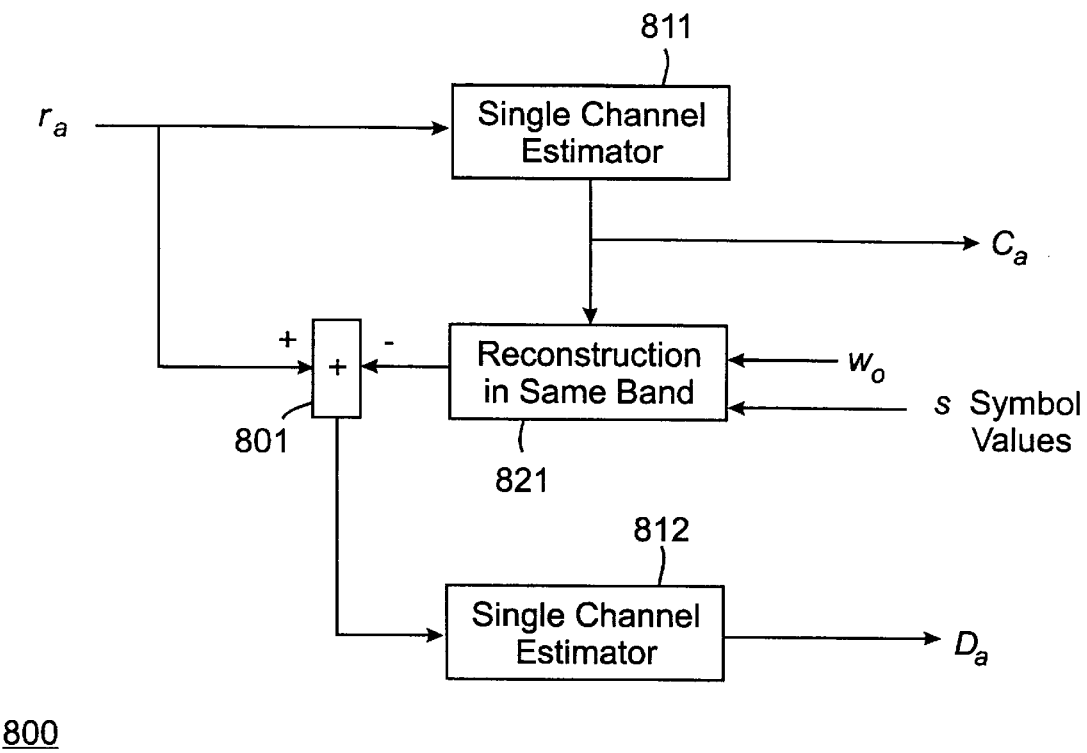
FIG. 8 depicts an alternative embodiment of the channel estimator of FIG. 6.
Figure 8:
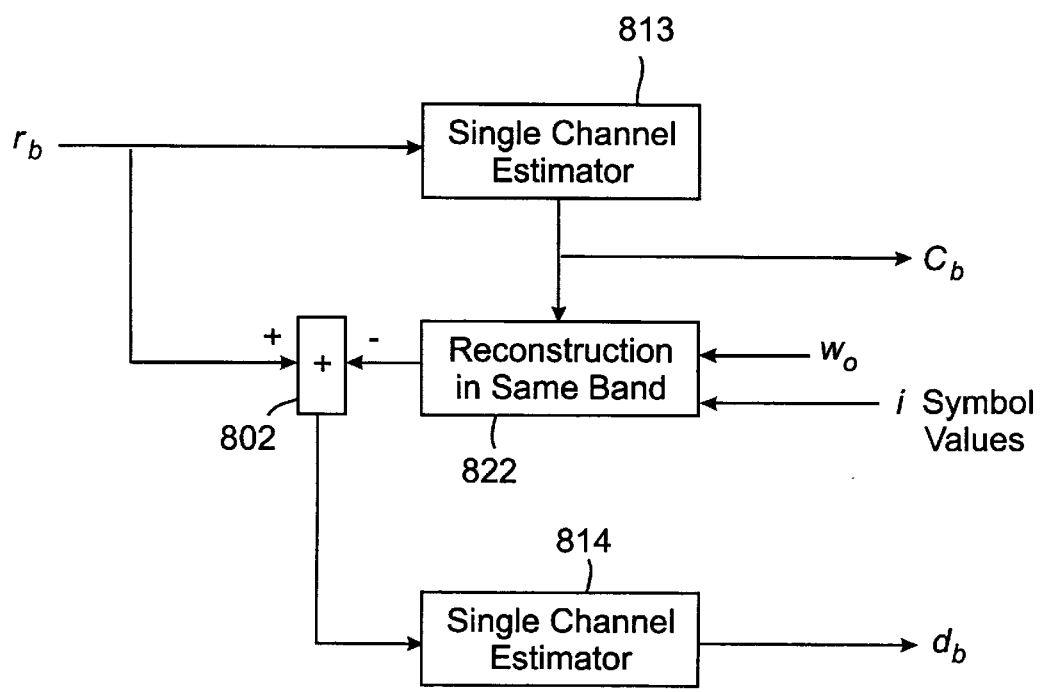

FIG. 8 depicts an alternative embodiment of a two-band channel estimation device 800 according to the present invention. As shown, the channel estimation device 800 includes first and second summing devices 801, 802, first, second, third and fourth single-channel estimators 811, 812, 813, 814, and first and second reconstruction-in-same-band devices 821, 822. The first received baseband signal $r_a$ is coupled to an input of the first single-channel estimator 811 and to an additive input of the first summing device 801. A first channel parameter estimate $c_a$ output by the first single-channel estimator 811 (corresponding to the first signal s in the first band a) is coupled to a first input of the first reconstruction-in-same-band device 821. The carrier spacing 107 $_0$ is coupled to a second input of the first reconstruction-in-same-band device 821, and symbol values for the first signal s are coupled to a third input of the first reconstruction-in-same-band device 821. An output of the first reconstruction-in-same-band device 821 is coupled to a subtractive input of the first summing device 801, and an output of the first summing device 801 is coupled to an input of the second single-channel estimator 812. The second single-channel estimator 812 provides a second channel parameter estimate $D_a$ corresponding to the second signal i as received in the first band a.

The second received baseband signal $r_b$ is coupled to an input of the third single-channel estimator 813 and to an additive input of the second summing device 802. A third channel parameter estimate $C_b$ output by the third single-channel estimator 813 (corresponding to the first signal s in the second band b) is coupled to a first input of the second reconstruction-in-same-band device 822. The carrier spacing $\omega_0$ is coupled to a second input of the second reconstruction-in-same-band device 822, and symbol values for the second signal i are coupled to a third input of the second reconstruction-in-same-band device 822. An output of the second reconstruction-in-same-band device 822 is coupled to a subtractive input of the second summing device 802, and an output of the second summing device 802 is coupled to an input of the fourth single-channel estimator 814. The fourth single-channel estimator 814 provides a fourth channel parameter estimate $d_b$ corresponding to the second signal i as received in the second band b.

In operation, the first single-channel estimator 811 uses samples of the first received baseband signal $r_a$ to provide the first channel parameter estimate $c_a$ by, for example, least squares estimation of $c_a$ only. For this case, the least squares cost function depends on the function $$e_a(n)=r_a(n)-c_a(0)s(n)-c_a(1)s(n-1).$$

The reconstruction-in-same-band device 821 then uses the first channel parameter estimate $c_a$ to reconstruct an estimate of the first signal s in the first band a in a fashion similar to that described above with respect to the reconstruction devices of FIGS. 4 and 5. The first summing device then subtracts the reconstructed signal from the first received baseband signal $r_a$ to provide a canceled signal which represents an estimate of the interfering signal i as received in the first band a. The second single-channel estimator 812 uses the canceled signal to provide the second channel estimate $D_a$ corresponding to the second signal i in the first band a. Operation of the second single-channel estimator 812 is analogous to operation of the first single-channel estimator 811 as described above.

Since the first signal s is typically received more strongly in the first band a than is the second signal i, the first channel estimate $c_a$ can be computed accurately in spite of the adjacent channel interference from signal i. Additionally, by subtracting the first signal s from the first received baseband signal $r_a$, estimation of the second channel parameter $D_a$ is improved. Thus, the estimate of $D_a$ will be more accurate than if $D_a$ were estimated without removing the first signal s. Computation of the third and fourth channel estimates $C_b$, $d_b$ via the third and fourth single-channel estimators 813, 814, the second summing device 802, and the second reconstruction-in-same-band device 822 is analogous to computation of the first and second channel estimates $c_a$, $D_a$ as described above.

The approach of demodulating the stronger of two adjacent channel signals and then using the result to assist demodulation of the weaker of the two signals works well when the signals are of significantly different levels. The generalization of this approach is to sort the signals received in a raster of adjacent frequency channels into signal strength order, and to demodulate them in order strongest to weakest.

When all signals are of similar level, conventional systems would not in any case expect to suffer from adjacent channel interference. However, the present invention can be used to space channels closer together in frequency in order to gain capacity, to the point where conventional demodulators would suffer from adjacent channel interference even with equal signal levels in all channels. In such case, the iterative approach previously described can be applied, in which signal estimates are first made without the benefit of adjacent channel signal estimates, and then subsequently refined with the benefit of adjacent channel estimates.

The apparent problem of needing a first signal s to decode a second signal i, and conversely needing the second signal i to decode the first signal s, can also be solved using the Viterbi algorithm, also known as Maximum Likelihood Sequence Estimation (MLSE). One method of applying MLSE is to assume all possible results for the second signal i in turn and to determine a separate estimate for the first signal s in association with each assumption for the second signal i. Then, for each separate estimate of the first signal s, an estimate for the second signal i is determined with the constraint that the estimate for the second signal i must logically be the same as that originally assumed in obtaining the corresponding estimate for the first signal s. The estimate for the second signal i is obtained in the form of a likelihood measure or "metric" that estimates or assumes that the second signal i is correct. The likelihood metrics for each of the separate second-signal assumptions and associated first-signal estimates are then compared and the best likelihood value is selected for the joint decision of the first signal s and the second signal i.

For example, equation (5) provides the expected value of the received signal in terms of a current first-signal symbol s(n), the previous first-signal symbol s(n−1), the current second-signal symbol (rotated) i'(n) and the previous second-signal symbol i'(n−1). Similarly, equation (9) provides the expected value of the received signal in the adjacent channel as a function of the same four symbols.

To make a decision on previous symbols s(n−1) and i(n−1), the current symbols s(n), i(n) are used. Since they are not yet known, they are hypothesized in turn to be one of the four possible binary bit pairs (i.e., s(n)/i(n=0/0, 0/1, 1/0 and 1/1) and, for each bit pair, the previous symbols s(n−1) and i(n−1) are also hypothesized to be one of the four possible bit pairs (00, 01, 10, 11). The four bits for each of the sixteen cases are then used in equations (5) and (9) to predict the first and second received signal values $r_a(n)$, $r_b(n)$.

The predictions are compared with the actual received signals and the squares of the errors (i.e., [predicted $r_b$−actual $r_b$]$^2$ and [predicted $r_a$−actual $r_a$]$^2$) are additively accumulated into a likelihood metric value for each hypothesis. The likelihood metrics for the four hypotheses having the same values of s(n) and i(n) but different values of s(n−1) and i(n−1) are then compared and that having the greatest likelihood (i.e., lowest cumulative metric) is selected and the associated values of s(n−1) and i(n−1) are selected as the best decoded values of s(n−1) and i(n−1) for that value pair s(n) and i(n). This process is repeated for each value pair s(n) and i(n), obtaining a potentially different decision s(n−1) and i(n−1) for each case, with an associated cumulative likelihood metric.

Upon receipt of subsequent signal samples $r_a$(n+1) and $r_b$(n+1) the process is repeated to determine decisions for s(n) and i(n) (and their already associated decisions for s(n−1) and i(n−1)) for each of the four possible cases of s(n+1) and i(n+1), and so forth. The process continues to elongate the four chains of already-decided symbols (s(n), i(n), s(n−1), i(n−1) . . . ), each chain associated with an as-yet unresolved symbol pair s(n+1) and i(n+1). The older symbols in the chain tend to agree across all four chains, and when this occurs, the answer is unambiguous and the values can be extracted as "final" decisions, shortening the chains by one symbol.

The above process is the familiar Viterbi MLSE process as applied to the joint demodulation of two adjacent channel signals. In the example above, the process progresses by demodulating signal samples received successively in time in two adjacent channels, although the method can be extended to more than two adjacent channels by expanding the number of retained "chains" of partially-decided symbols, known as the path history or Viterbi states.

The number of Viterbi states in the above method is equal to $M^{j(l-1)}$, where M is the size of the symbol alphabet (2 for binary), j is the number of jointly demodulated adjacent channels, and l is the number of time-sequential symbols of each signal on which each channel signal depends (note that l=2 in the example represented by equations (5) and (9)). Thus, the complexity expands exponentially with an increase in the number of jointly demodulated channels j.

The parent application (i.e., U.S. patent application No. Ser. 08/393,809 incorporated by reference above) describes a novel variant of MLSE in which processing progresses by demodulating samples received at successive locations along a spatial dimension, or alternatively, samples received at the same instant of time in successive channels spaced along a frequency dimension. For example, one can express multiple baseband signal samples $r_a$, $r_b$, $r_c$, . . . , received in successive channels a, b, c . . . , using equations similar to equations (5) and (9) as follows:

$$r_a(n)=\ldots c_a(0)s_a(n)+c_a(1)s_a(n-1)+C'_b(0)s_b(n)+C'_b(1)s_b(n-1)$$

$$r_b(n)=C''_a(0)s_a(n)+C''_a(1)s_a(n-1)+c_b(0)s_b(n)+c_b(1)s_b(n-1)+C'_c(0)s_c(n)+C'_c(1)s_c(n-1)$$

$$i\ r_c(n)=C''_b(0)s_b(n)+C''_b(1)s_b(n-1)+c_c(0)s_c(n)+c_c(1)s_c(n-1)+C'_d(0)s_d(n)\ C'_d(1)s_d(n-1)$$

$$r_d(n)=\ldots$$

$$r_e(n)=\ldots$$

where $s_a$, $s_b$, $s_c$ . . . refer to symbols transmitted on successive adjacent channels a, b, c . . . , $c_a(0)$, $c_a(1)$ describe the influence of the current symbol $s_a(n)$ and the previous symbol $s_a(n-1)$ on the signal $r_a(n)$ in channel a at instant n. The prime values describe the influence on the current channel of symbols transmitted in a higher frequency adjacent channel while the double prime values describe the influence on the current channel of symbols transmitted in a lower frequency adjacent channel.

Taking the second channel b as typical, the signal value $r_b(n)$ received in that channel at instant n is seen to depend on six symbols, namely the two symbols $s_a(n)$, $s_a(n-1)$ in the lower adjacent channel, the two symbols $s_b(n)$, $s_b(n-1)$ of the second channel b itself, and the two symbols $s_c(n)$, $s_c(n-1)$ of the upper adjacent channel. The six symbols can take on any of two to the power six, or sixty-four, possible values, if each symbol is a binary symbol. For each of the sixty-four cases, the six symbol values are used to predict the value $r_b(n)$ and the predicted value is compared with the received value of $r_b(n)$. The square of the error between the predicted and actual values is then accumulated with a cumulative likelihood metric for each hypothesis. Pairs of hypotheses having the same values of $s_a(n)$, $s_b(n)$, $s_b(n-1)$, $s_c(n)$, $s_c(n-1)$ but different values of $s_a(n-1)$ are then compared, and one of each pair is selected along with its cumulative metric and associated $s_a(n-1)$ value. The selected metric and $s_a(n-1)$ value is then stored in association with each of the thirty-two surviving hypotheses. According to the invention of the parent application, MLSE processing then progresses to process the value $r_c(n)$ of the next frequency channel received at the same instant n. This is dependent on two symbols $s_d(n)$, $s_d(n-1)$ not previously hypothesized. Adding those to the list expands the number of hypotheses from thirty-two to one hundred and twenty-eight (128). After computing new cumulative metrics for each of the 128 states, pairs of states differing only in their associated value of $s_b(n-1)$ are compared and that one of the pair having the best metric is selected, along with the associated $s_b(n-1)$ value. Thus, the number of states is reduced by two to sixty-four. The process continues to first expand the number of states by four and then to reduce it by two until the final channel in a series of adjacent channels is processed, which does not suffer from interference in a yet higher channel that can be dealt with by the method (i.e., any higher channel interference is of an unknown kind). The number of remaining states is then equal to two to the power of the number of channels, and each state is associated with one possible hypothesis for the symbols $s_a(n)$, $s_b(n-1)$ . . . together with associated decisions for symbols $s_a(n-1)$, $s_b(n-1)$ . . . .

The number of states is small after processing only the first signal sample in the first channel $r_a(1)$, and thereafter doubles until a steady state is reached of $M^{j(l-1)+1}$ for all channels processed except the last, for which the number of retained states is $M^{j(l-1)}$ as with time-sequential MLSE.

However, j in the above is only equal to the number of contiguous adjacent channels (without a gap) that must be processed in this way. A gap is created, truncating the value of j, both when a channel contains a signal weaker than the others that can be ignored, or contains a signal stronger than the others that can be processed without knowledge of the adjacent channels. The stronger signals are thus processed ahead in the time dimension first and then subtracted out to create gaps in the frequency dimension which reduce the number of contiguous channels that might have to be processed using MLSE along the frequency dimension.

Those skilled in the art will appreciate that other forms of channel estimation can be used to provide channel estimates for the demodulator embodiments of FIGS. 4 and 5. For example, knowledge of the transmit and/or receive filters can be used to improve channel estimation as described in pending U.S. patent application Ser. No. 08/625,010, now, U.S. Pat. No. 5,838,739, filed Mar. 29, 1996 and incorporated herein by reference. Additional suitable forms of channel estimation are described in U.S. patent application Ser. No. 08/901,694, filed on even date herewith and entitled "Methods and Apparatus for Joint Demodulation of Adjacent Channel Signals in Digital Communications Systems", which is incorporated herein in its entirety by reference.

Though the embodiments have been described with respect to two transmitted signals s, i and two frequency bands, those skilled in the art will immediately appreciated that the teachings of the present invention can be applied where there are a plurality of transmitted signals and frequency bands. Those skilled in the art will also appreciate that the teachings of the present invention are applicable to systems other than that shown in FIG. 1. For example, multiple carrier signals can be transmitted from one common transmitter and/or one common transmit antenna. Also, the system may include more than one receive antenna, such as in a phased array, a spatial diversity array, or a polarization diversity array. Thus, the baseband processor can receive samples corresponding to multiple antennas, beams, polarizations, or other types of receive channels. Furthermore, micro-diversity and/or macro-diversity can be used. Cancellation is typically best performed using detected symbols after diversity combining has been applied. Diversity combining can be, for example, metric combining or interference rejection combining.

It will also be apparent to those skilled in the art that the present invention can be combined with other receiver techniques. For example, per-survivor processing can be applied in which multiple sets of channel estimates are kept (corresponding to multiple possible detected symbol sequences). Also, multiple cancellation operations can be performed (corresponding to different detected symbol sequences). Though a symbol-spaced example is given, those skilled in the art will appreciate that the present invention is also readily applied to fractionally-spaced reception.

The channel estimation can be adaptive, for example in a D-AMPS system where the channels change with time within a TDMA slot. Also, the receiver can perform further signal processing, such as de-interleaving, decoding of error correction or error detection codes, and decryption. In some systems, coding and modulation are combined, and it will thus be appreciated that demodulation as used herein can include decoding.

Thus, those skilled in the art will appreciate that the present invention is not limited to the specific exemplary embodiments which have been described herein for purposes of illustration. The scope of the invention is defined by the claims which are appended hereto, rather than the foregoing description, and all equivalents which are consistent with the meaning of the claims are intended to be embraced therein.

What is claimed is:

1. A baseband processor, comprising:

means for receiving a plurality of baseband sample streams, each stream corresponding to one of a plurality of communications frequency bands; and a plurality of demodulating means, each demodulating means for demodulating a received signal using one of said received baseband sample streams to produce detected symbols, wherein at least one of said demodulating means also uses detected symbols produced by at least one other of said demodulating means to demodulate a received signal.

2. A baseband processor according to claim 1, wherein a first demodulation means produces first detected symbols corresponding to a first transmitted signal and a first frequency band, and wherein a second demodulation means produces second detected symbols corresponding to a second transmitted signal and a second frequency band, further comprising:

means for computing, based on the first detected symbols, a first reconstructed signal corresponding to the first transmitted signal as received in the second frequency band;

means for computing, based on the second detected symbols, a second reconstructed signal corresponding to the second transmitted signal as received in the first frequency band;

means for canceling the second reconstructed signal from first received baseband samples to provide a first canceled signal; and means for canceling the first reconstructed signal from second received baseband samples to provide a second canceled signal, wherein said first demodulation means produces additional first detected symbols based on the first canceled signal, and wherein said second demodulation means produces additional second detected symbols based on the second canceled signal.

3. A baseband processor according to claim 2, further comprising:

means for receiving a stream of baseband samples corresponding to a communications frequency band; and means for jointly estimating a plurality of channel responses for said communications frequency band, wherein each channel response corresponds to one of a plurality of transmitted signals.

4. A baseband processor according to claim 2, further comprising:
   means for receiving a stream of baseband samples corresponding to a communications frequency band; and
   means for successively estimating a plurality of channel responses for said communications frequency band, wherein each channel response corresponds to one of a plurality of transmitted signals.

5. A baseband processor according to claim 1, further comprising:
   means for determining a strongest signal and a weakest signal,
      wherein a first demodulation means produces, based on a first received baseband sample stream corresponding to the strongest signal, first detected symbols for the strongest signal;
   means for computing, based on the first detected symbols, a reconstructed signal corresponding to the strongest signal as received in a frequency band corresponding to the weakest signal; and
   means for canceling the reconstructed signal from a received baseband sample stream corresponding to the weakest signal to provide a canceled signal,
      wherein a second demodulation means produces, based on the canceled signal, second detected symbols for the weakest signal.

6. A baseband processor according to claim 5, further comprising:
   means for receiving a stream of baseband samples corresponding to a communications frequency band; and
   means for jointly estimating a plurality of channel responses for said communications frequency band, wherein each channel response corresponds to one of a plurality of transmitted signals.

7. A baseband processor according to claim 5, further comprising:
   means for receiving a stream of baseband samples corresponding to a communications frequency band; and
   means for successively estimating a plurality of channel responses for said communications frequency band, wherein each channel response corresponds to one of a plurality of transmitted signals.

8. A channel estimator, comprising:
   means for receiving a stream of baseband samples corresponding to a communications frequency band; and
   means for estimating a plurality of channel responses for said communications frequency band corresponding to a plurality of adjacent channel signals wherein said channel responses are estimated successively.

9. A channel estimator according to claim 8, wherein said means for estimating a plurality of channel responses comprises:
   means for computing, based on the received stream of baseband samples, an estimate of a first channel response corresponding to a first transmitted signal received in said communications frequency band;
   means for computing, based on the estimate of the first channel response, a reconstructed signal corresponding to the first transmitted signal as received in said communications frequency band;
   means for removing the reconstructed signal from the received stream of baseband samples to provide a canceled signal; and
   means for computing, based on the canceled signal, an estimate of a second channel response corresponding to a second transmitted signal received in said communications frequency band.

10. A method for baseband processing, comprising the steps of:
    receiving a plurality of baseband sample streams, each stream corresponding to one of a plurality of communication frequency bands;
    demodulating a first signal using one of said received baseband sample streams to produce first detected symbols; and
    demodulating a second signal using a second received baseband sample stream and the first detected symbols to produce second detected symbols.

11. A method according to claim 10, comprising the steps of:
    receiving a stream of baseband samples corresponding to a communication frequency band; and
    jointly estimating a plurality of channel responses for said communication frequency band, wherein each channel response corresponds to one of a plurality of transmitted signals.

12. A method according to claim 10, comprising the steps of:
    receiving a stream of baseband samples corresponding to a communication frequency band; and
    successively estimating a plurality of channel responses for said communication frequency band, wherein each channel response corresponds to one of a plurality of transmitted signals.

13. A method for baseband processing, comprising the steps of:
    producing first detected symbols corresponding to a first transmitted signal and a first frequency band;
    producing second detected symbols corresponding to a second transmitted signal and a second frequency band;
    computing, based on the first detected symbols, a first reconstructed signal corresponding to the first transmitted signal as received in the second frequency band;
    computing, based on the second detected symbols, a second reconstructed signal corresponding to the second transmitted signal as received in the first frequency band;
    canceling the second reconstructed signal from first received baseband samples to provide a first canceled signal;
    canceling the first reconstructed signal from second received baseband samples to provide a second canceled signal; and
    producing additional first and second detected symbols based on the first and second canceled signals, respectively.

14. A method for baseband processing, comprising the steps of:
    determining a strongest signal and a weakest signal;
    producing, based on a first received baseband sample stream corresponding to the strongest signal, first detected symbols for the strongest signal;
    computing, based on the first detected symbols, a reconstructed signal corresponding to the strongest signal as received in a frequency band corresponding to the weakest signal;
    canceling the reconstructed signal from a received baseband sample stream corresponding to the weakest signal to provide a canceled signal; and producing, based on the canceled signal, second detected symbols for the weakest signal.

15. A method for channel estimation, comprising the steps of:

receiving a stream of baseband samples corresponding to a communications frequency band; and estimating a plurality of channel responses for said communications frequency band corresponding to a plurality of adjacent channel signals wherein said channel responses are estimated successively.

16. A method according to claim 15, wherein said step of estimating a plurality of channel responses comprises the steps of:

computing, based on the received stream of baseband samples, an estimate of a first channel response corresponding to a first transmitted signal received in said communications frequency band;

computing, based on the estimate of the first channel response, a reconstructed signal corresponding to the first transmitted signal as received in said communications frequency band;

removing the reconstructed signal from the received stream of baseband samples to provide a canceled signal; and computing, based on the canceled signal, an estimate of a second channel response corresponding to a second transmitted signal received in said communications frequency band.

* * * * *